(12) United States Patent
Hohwald (10) Patent No.: US 9,678,993 B2
(45) Date of Patent: Jun. 13, 2017

(54) CONTEXT BASED SYSTEMS AND METHODS FOR PRESENTING MEDIA FILE ANNOTATION RECOMMENDATIONS

(71) Applicant: SHUTTERSTOCK, INC., New York, NY (US)

(72) Inventor: Heath Walter Hohwald, Logrono (ES)

(73) Assignee: SHUTTERSTOCK, INC., New York, NY (US)

(*) Notice: Subject to any disclaimer, the term of this patent is extended or adjusted under 35 U.S.C. 154(b) by 598 days.

(21) Appl. No.: 14/165,694

(22) Filed: Jan. 28, 2014

(65) Prior Publication Data

US 2014/0280113 A1    Sep. 18, 2014

Related U.S. Application Data

(60) Provisional application No. 61/781,073, filed on Mar. 14, 2013, provisional application No. 61/873,514, filed on Sep. 4, 2013.

(51) Int. Cl.
G06F 17/30    (2006.01)

(52) U.S. Cl.
CPC .............................. *G06F 17/30268* (2013.01)

(58) Field of Classification Search
CPC .................................................. G06F 17/30268
USPC ......................................................... 707/728
See application file for complete search history.

(56) References Cited

U.S. PATENT DOCUMENTS

| 5,893,095 A | 4/1999 | Jain |
| 5,983,237 A | 11/1999 | Jain |
| 6,212,517 B1 | 4/2001 | Sato |
| 6,332,120 B1 | 12/2001 | Warren |
| 6,526,400 B1 | 2/2003 | Takata |

(Continued)

FOREIGN PATENT DOCUMENTS

| EP | 0473186 B1 | 4/1999 |
| EP | 1415245 | 2/2011 |

OTHER PUBLICATIONS

L. Wu, L. Yang, N. Yu and X-S. Hua. Learning to tag. In Proceedings of the 18th international conference on World Wide Web, WWW '09, pp. 361-370, New York, New York, USA 2009. ACM.

(Continued)

*Primary Examiner* — Joshua Bullock
(74) *Attorney, Agent, or Firm* — McDermott Will & Emery LLP (57) ABSTRACT

A context based tag recommendation system for annotating stock photography media files, the system configured to: maintain a first database comprising a set of media files and a set of annotations associated with the media file set, maintain a second database comprising a second set of records, each record comprising an annotation, at least one co-occurring annotation, and a count, receive at least one media file tag input (input), query the second database using the input to identify a ranked set of co-occurring annotations and a count associated with each annotation in the ranked set of co-occurring annotations, query the first database to identify a selected set of similar media files, by iteratively retrieving image files associated a selective group of annotations from the ranked set of co-occurring annotations, present a list of recommended annotations based on the ranked set of co-occurring annotations and the selected set of similar media files.

18 Claims, 9 Drawing Sheets

(56) References Cited

U.S. PATENT DOCUMENTS

| | | | |
|---|---|---|---|
| 6,721,733 | B2 | 4/2004 | Lipson |
| 6,856,987 | B2 | 2/2005 | Kobayashi |
| 6,904,560 | B1 | 6/2005 | Panda |
| 7,006,689 | B2 | 2/2006 | Kasutani |
| 7,400,785 | B2 | 7/2008 | Haas |
| 7,664,803 | B2 | 2/2010 | Kobayashi |
| 7,685,198 | B2 * | 3/2010 | Xu ................. G06F 17/241 707/748 |
| 7,792,811 | B2 | 9/2010 | Nagarajayya |
| 8,392,430 | B2 | 3/2013 | Hua |
| 8,452,794 | B2 * | 5/2013 | Yang ................. G06F 17/30277 707/767 |
| 8,559,731 | B2 * | 10/2013 | Mass ................. G06F 17/30265 382/159 |
| 8,571,850 | B2 * | 10/2013 | Li ................. G06F 17/241 382/224 |
| 2002/0042794 | A1 | 4/2002 | Konaka |
| 2005/0050469 | A1 | 3/2005 | Uchimoto |
| 2005/0114319 | A1 | 5/2005 | Brent |
| 2006/0206516 | A1 | 9/2006 | Mason |
| 2007/0287458 | A1 | 12/2007 | Gupta |
| 2008/0104065 | A1 | 5/2008 | Agarwal |
| 2008/0282186 | A1 | 11/2008 | Basavaraju |
| 2009/0138445 | A1 | 5/2009 | White |
| 2011/0035350 | A1 * | 2/2011 | Zwol ................. G06F 17/241 706/52 |
| 2011/0145327 | A1 * | 6/2011 | Stewart ................. G06F 17/3002 709/203 |
| 2011/0176737 | A1 * | 7/2011 | Mass ................. G06F 17/30265 382/220 |
| 2011/0218852 | A1 | 9/2011 | Zhang |
| 2011/0282867 | A1 * | 11/2011 | Palermiti, II ........ G06K 9/6253 707/722 |
| 2012/0101893 | A1 | 4/2012 | Tsai |
| 2012/0219191 | A1 * | 8/2012 | Benzarti ............ G06K 9/00677 382/106 |
| 2012/0226651 | A1 * | 9/2012 | Chidlovskii ........... G06Q 10/10 706/52 |
| 2012/0233170 | A1 | 9/2012 | Musgrove |
| 2012/0254151 | A1 | 10/2012 | Reitter |
| 2012/0323784 | A1 | 12/2012 | Weinstein |
| 2012/0324408 | A1 | 12/2012 | Shacham |
| 2013/0202205 | A1 * | 8/2013 | Liu ................... G06F 17/30268 382/170 |
| 2014/0067882 | A1 * | 3/2014 | Ikeuchi ............. G06F 17/30067 707/821 |
| 2014/0280232 | A1 * | 9/2014 | Chidlovskii ...... G06F 17/30265 707/749 |

OTHER PUBLICATIONS

M. Ames and M. Naaman. Why we tag: motivations for annotation in mobile and online media. In Proceedings of the SIGCHI Conference on Human Factors in Computing Systems, CHI '07, pp. 971-980, New York, NY, USA, 2007.

C. Wang, F. Jing, L. Zhang, and H.-J. Zhang. Content-based image annotation refinement. In CVPR, 2007.

C. Rashtchian, P. Young, M. Hodosh, and J. Hockenmaier. Collecting image annotations using amazon's mechanical Turk. In Proceedings of the NAACL HLT 2010 Workshop on Creating Speech and Language Data with Amazon's Mechanical Turk, CSLDAMT '10 pp. 139 {147, Stroudsburg, PA, USA, 2010. Association for Computational Linguistics.

R. Datta, D. Joshi, J. Li, and J.Z. Wang. Image Retrieval: Ideas, influences, and trends of the new age. ACM Computing Surveys, 40(2): 1-60, 2008.

B. Sigurbjornsson and R. van Zwol. Flickr tag recommendation based on collective knowledge, In Proceedings on the 17th International conference on World Wide web, Www '08, pp. 327-336, New York, NY USA, 2008. ACM.

"NicheBot.com", NicheBOT, 2016, https://web.archive.org/web/20130814214552/http://www.nichebot.com (last visited Aug. 14, 2013).

"KeywordDiscovery.com", a Trellian Company, 2004-2015, https://web.archive.org/web/20150421051135/http://keyworddiscovery.com/ (last visited May 20, 2015).

"WordTracker.com", Wordtracker LLP, 1998-2016, https://web.archive.org/web/20160914160615/https://www.wordtracker.com/ (last visited Sep. 14, 2016).

"spellweb.com", Markup.net, Inc., 2012-2016, https://web.archive.org/web/20160715091832/http://www.spellweb.com/ (last visited Jul. 15, 2016).

* cited by examiner

| Metric | FF-TAGS | RATED-TAGS |
|---|---|---|
| ASYM | .234 | .670 |
| SYM | .266 | .710 |
| SYM-ASYM | .314 | .806 |
| SIM-IMG | .420 | .864 |

Table 1: Precision @5 on evaluation crowd-sourced tag set and rated tag set

Fig. 6

Provide the 7 tags that best describe the image.

Instructions:
- Please provide 7 tags that you think best describe this image.
- Failure to provide all 7 tags or providing irrelevant tags may lead to HITs being rejected.
- Each tag should be a single English word.
- Under special circumstances a tag may be a group of English words that act as one word (such as "San Francisco" or "prime minister".
- No tag can be longer than 40 characters.
- The tags must describe the image, the contents of the image, or some relevant context.
- Please ignore the footer of the image when providing tags.

Image:

Tag 1:
Tag 2:
Tag 3:
Tag 4:
Tag 5:
Tag 6:
Tag 7:

A First Database 1000  1010

| File No. | Image File | Annotation |—1020
|---|---|---|
| 1 | Sunset_File.jpg<address:URL1> | Sunset<br>Red<br>Birds<br>Skyline<br>Sky<br>Cloud |
| 2 | City_File.jpg<address:URL2> | City<br>Building<br>Flyovers<br>Cars<br>Traffic<br>Busses<br>Billboards |

A Second Database 1120   1130   1140   1100

| Annotation No. | Annotation | Co-occurring Annotations | Count |
|---|---|---|---|
| 1 | Sunset | Sky | 10 |
| | | Sun | 8 |
| | | Red | 3 |
| | | Birds | 2 |
| | | cloud | 2 |
| | | Skyline | 1 |
| 2 | City | Skyline | 10 |
| | | Urban | 5 |
| | | Building | 3 |
| | | Cars | 2 |
| | | Busses | 2 |
| | | Billboards | 1 |

CONTEXT BASED SYSTEMS AND METHODS FOR PRESENTING MEDIA FILE ANNOTATION RECOMMENDATIONS

BACKGROUND

1. Field of Disclosure

The present disclosure generally relates to a context-based media file annotation recommendation system for annotating stock photography media files that presents a list of recommended annotations based on a selected set of similar annotations and a selected set of similar media files.

2. Brief Description of Related Art

In recent years, a number of large databases of digital images have been made accessible via the Internet. Typically, searchers looking for a specific digital image employ an image retrieval system for browsing, searching and retrieving images from the image databases. Most traditional image retrieval systems utilize some method of adding metadata to the images such as captioning, keywords, or descriptions and the like.

Subsequently, image retrieval can be performed by searching for text strings appearing in the metadata. Searching a particular image from a large image database via image retrieval systems can be challenging at times. For most large-scale image retrieval systems, performance may depend upon the accuracy of the image metadata. Although the performance of the content-based image retrieval systems has significantly improved in recent years, typically image contributors may still be required to provide appropriate keywords or tags that describe a particular image.

Previous work has explored methods for circumventing this problem. One area where image tag recommendation remains underexplored is in the context of online stock photography. The application of tag recommendation techniques to online stock photography has not yet been explored.

Figure 3:
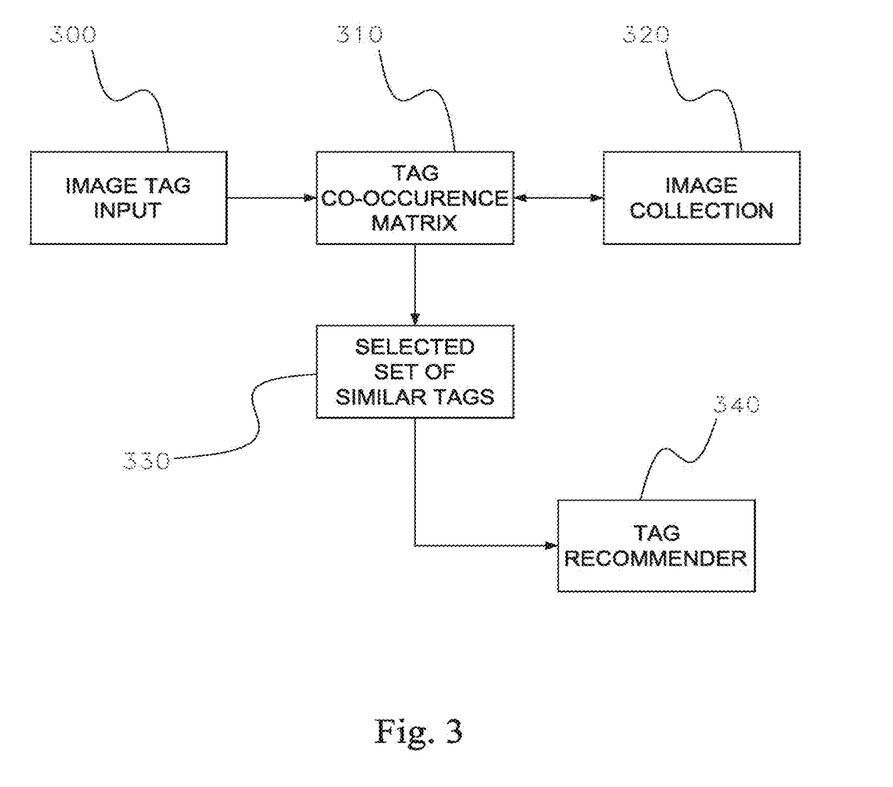
FIG. 3 depicts a flow chart of events happening when using a co-occurrence based tag recommender.

One shortcoming of co-occurrence based tag recommenders such as tag recommender 340 depicted in FIG. 3 is that the tag recommenders are purely text-based. In other words, the alphanumeric text string of the selected similar tags 330 that are extracted from the tag co-occurrence matrix 310 is, at least in part, identical to the alphanumeric text string of the image tag input 300. The conventional tag co-occurrence based recommenders neither capture image context information nor consider non-textual similarities between images.

As the name suggests, the conventional tag co-occurrence based recommenders may only consider text strings of image tags and identify similarities between the text strings of image tags. Besides image tags, images have many other attributes such as image type, image color, image texture, image content, image context, image source, image ratings, media type and the like. These non-textual similarities can be of vital importance in generating succinct image tags that are so crucial in generating stock photography revenue. Given that non-textual similarities between images can play an important role in suggesting appropriate and concise tags, a novel recommender is needed to cure the infirmity.

BRIEF SUMMARY

By way of introduction only, the present embodiments provide a context based tag recommendation system for annotating stock photography media files, the system configured to: maintain a first database comprising a set of media files and a set of annotations associated with each media file set; maintain a second database comprising a list of annotations associated with each media file in the first database (list), and a corresponding set of co-occurring annotations; maintain a third database comprising a media file in the first database, a set of annotations associated with the media file, a list of similar media files, and a set of annotations associated with the list of similar media files, receive an image tag input, query the second database using the image tag input to identify a selected set of similar annotations; and present a list of recommended annotations based on the selected set of similar annotations and the selected set of similar images. The foregoing discussion of the preferred embodiments has been provided only by way of introduction. Nothing in this section should be taken as a limitation of the claims, which define the scope of the invention.

DETAILED DESCRIPTION OF THE PRESENTLY PREFERRED EMBODIMENTS

The present disclosure describes computer implemented systems and methods, that may utilize an algorithm, for use in a graphical user interface employing efficient annotation strategies for tagging stock photography media files. The disclosed method recommends media file annotations based on a tag co-occurrence, and context information derived from a selected set of similar media files. With the increasing rate of multimedia content creation and associated growth in media file collections, the task of retrieving relevant media files from a gigantic collection of media files has become more challenging than ever. Typically, media file search systems do not conduct media file searches based on detecting information contained in the media file itself. In contrast, like other search engines, most media file search engines have access to metadata of several media files, wherein metadata may be indexed and stored in a large database. When a media file search request is generated by a user specifying a search criterion, the media file search engine browses through the index to identify search results comprising a set of media file files that meet the user specified search criteria. The search engine generally presents the search results in the order of relevancy. The usefulness of a media file search engine may depend on the relevance of the search results generated by the search engine along with the ranking algorithms employed in ranking the search results in the order of relevancy. Search results may also include a set of thumbnail media files, sorted by relevancy, where each thumbnail is a link back to the original web site where that media file is located.

In this specification, a media file may refer to any file in a digital storage device such as an audio, video or image file. These files come in different file formats such as mp3, aac and wma for audio file and mkv, avi and wma for video files. The terms "media file" and "image" or "image file" are used interchangeably throughout this specification. Media file indexing is one of the basic methods employed for conducting an efficient media file search. Media file indexing comprises associating a set of relevant keywords or tags with a relevant set of media files. Performance of the media file search and retrieval systems may become increasingly dependent upon the quality of the media file tags. Thus, designating appropriate media file tag attributes can be extremely important for optimal performance of media file search and retrieval systems. It is desired that media file tags should be both relevant and comprehensive.

In photo sharing sites such as Flickr, tags are usually provided by the contributor of the media file or members of the media file provider's social circle. The process of tagging media files, however, can be tedious and error prone. For this reason, tag recommendation can not only help reduce the burden of tag providers and speed up the tagging process, but can also improve the quality of the recommended tags.

Tag recommenders can be employed using two separate approaches. First, effective tag recommenders can be employed interactively, wherein tag recommenders suggest tags which can be either accepted or rejected by a user at the time a media file is uploaded in a media file collection. Alternatively, tag recommenders can be employed automatically where, based on a knowledge base, whenever a media file is uploaded in the media file collection, a tag recommender automatically generates a set of tags for the uploaded media file without any human intervention. In addition to speeding up the tagging process, a tag recommender also helps reduce the tag misspelling rate. Further, a tag recommender assists contributors who are asked to supply tags in a foreign language.

In stock photography, photographs of various subject matters such as people, pets, and travels etc. are licensed for specific uses. Instead of hiring a photographer for a specific assignment, in stock photography, licensed photographs often fulfill the demands for creative assignments at a lower cost. Presently, stock media files can be searched, purchased and delivered online via several searchable online databases. Revenue generation in stock photography sites is different from revenue generation in conventional photography search sites. In particular, stock photography contributors may provide higher quality media files and are compensated when one of their media files is downloaded. This provides increased incentive for stock photography contributors to effectively tag their media files.

From a revenue generation perspective, it is essential that the stock photography media files are precisely annotated and carefully organized. Even for stock photography contributors, tagging still remains a time consuming and challenging task. Accordingly, in the field of stock photography, a need exists for an effective tag recommender.

In order to develop an effective tag recommender for the stock photography domain, a large collection of media files from a prominent stock photography site was analyzed to study tagging behavior of contributors. When the results were compared to previous photo sharing research, it was observed that notable differences exist between tagging behavior of stock photography contributors and other media file photography contributors. It was observed that, by itself, media file retrieval backed by the tags generated by the conventional tag based recommender was unable to effectively locate stock photography media files. After studying a contributor's motivation for providing tags, it was observed that organizational needs were more important than facilitating easy media file retrieval. [See: M. Ames and M. Naaman. "Why we tag: motivations for annotation in mobile and online media". In Proceedings of the SIGCHI Conference on Human Factors in Computing Systems, CHI '07, pages 971-980, New York, N.Y., USA, 2007. ACM.] [Ames et al.] This may be the case because generating a large set of tags for a given media file is known to be a difficult task [See: C. Wang, F. Jing, L. Zhang, and H.-J. Zhang. "Content-based media file annotation refinement". In CVPR, 2007.] [Wang et al.].

A crowd-sourcing approach has been proposed as an effective tool to ease the burden of tagging a large number of media files. One of the issues associated with using a crowd-sourcing approach is that maintaining the quality of generated tags can be a challenge nonetheless. An initial experiment was conducted using qualification tests to assert quality control while gathering image annotation data from Amazon's Mechanical Turk (MTurk) (First experiment) Prescreening the MTurkers using the qualification tests and only allowing qualified candidates to undertake the annotation task was shown to be the best strategy for improving the quality of the generated image annotation data [See: C. Rashtchian, P. Young, M. Hodosh, and J. Hockenmaier. "Collecting image annotations using amazon's mechanical turk". In Proceedings of the NAACL HLT 2010 Workshop on Creating Speech and Language Data with Amazon's Mechanical Turk, CSLDAMT '10, pages 139-147, Stroudsburg, Pa., USA, 2010. Association for Computational Linguistics.] [Rashtchian et al.].

To overcome this deficiency, a co-occurrence based tag recommender was designed using the insight from the behavioral analysis. Interestingly, the performance of the tag recommender was significantly improved when similar images context information was made available to the tag recommender in addition to the tag co-occurrence context information. After exploring several different recommendation strategies, it was observed that tag recommender performance is significantly improved when a recommender uses a combination of tag co-occurrence context information along with similar image context information, as compared to a recommender that only uses tag co-occurrence context information. Thus, a novel recommender was designed that uses, along with tag co-occurrence information, similar image information to supply more context information to the tag recommender.

It was found that the added context information often led to improved quality of recommended tags as measured by two independent experiments. Two independent experiments were conducted to confirm this finding. The new recommender was constructed in order to capture three different insights in the domain of stock photography: (1) Tagging behavior in the stock photography setting is demonstrably different from popular photo sharing services. (2) Studies exploring different tag co-occurrence measures indicate that a linear combination of two specific measures may lead to an optimal performance of the tag recommender. (3) Conducted studies empirically demonstrate that a novel strategy that incorporates similar images context information to the conventional co-occurrence based tag recommender can not only expand the range of contextual information made available to the tag recommender, but can also significantly improve the precision and accuracy of the recommended tags.

Figure 1:
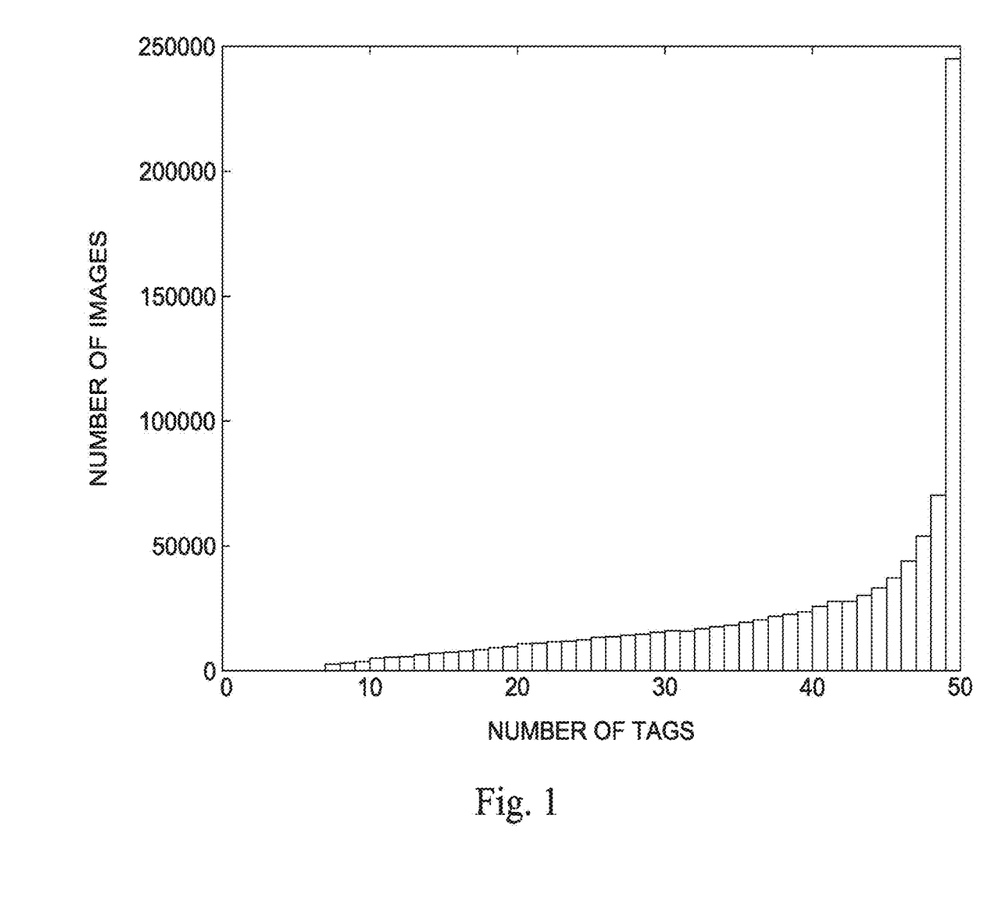
FIG. 1 depicts a graphical representation of the distribution of the number of tags per image.

Previous research has analyzed the image tagging behavior of contributors to online photo sharing services [See: B. Sigurbjörnsson and R. van Zwol. "Flickr tag recommendation based on collective knowledge". In Proceedings of the 17th international conference on World Wide Web, WWW '08, pages 327-336, New York, N.Y., USA, 2008. ACM.] [Sigurbjörnsson]. Typically, online photo sharing services such as Flickr do not impose any restriction either on the number of tags or on the nature of tags a user can provide for a given image. While image contributors of the online photo sharing services do have some motivation to tag their images, the level of motivation is not as high as the motivation of the image contributors of an online stock photography site [See: Ames et al.]. Resultantly, Flickr images may seldom have more than a handful of tags [Sigurbjörnsson]. As seen in FIG. 1, in contrast to online photography images, stock photography images typically have greater number of tags.

As discussed above, typically the contributors of online stock photography are highly motivated because stock photography contributors are only compensated after an image is downloaded. Likewise, as discussed above, stock photography contributors are compensated each time an image is downloaded. If stock photography images are precisely tagged, then there is a greater probability that the images can be easily searched and downloaded. Hence stock photography contributors are highly motivated to supply accurate and concise tags. Accordingly, many stock photography sites often undertake measures to avoid keyword spam. For the site considered in the first experiment that was conducted, a hard limit of 50 tags per image was imposed. [First experiment]

To understand the implications of this tag limit, a set of one million images was randomly chosen from the stock photography collection. FIG. 1 depicts a graphical representation of the distribution of the number of tags per image. In FIG. 1, y axis indicates the number of images with a given number of tags, for example about 250,000 images were found to have exactly 50 tags. The 50 tag limit is evident and the distribution of tags per image is heavily asymmetric and skewed to the right. As compared to Flickr, in a domain where contributors have a marked interest in providing keywords, a pronounced increase in the number of tags provided is to be expected [Sigurbjörnsson]. Unlike the tag distribution in Flickr, it was observed that the power law was not a good fit for the tag distribution in stock photography.

Figure 2:
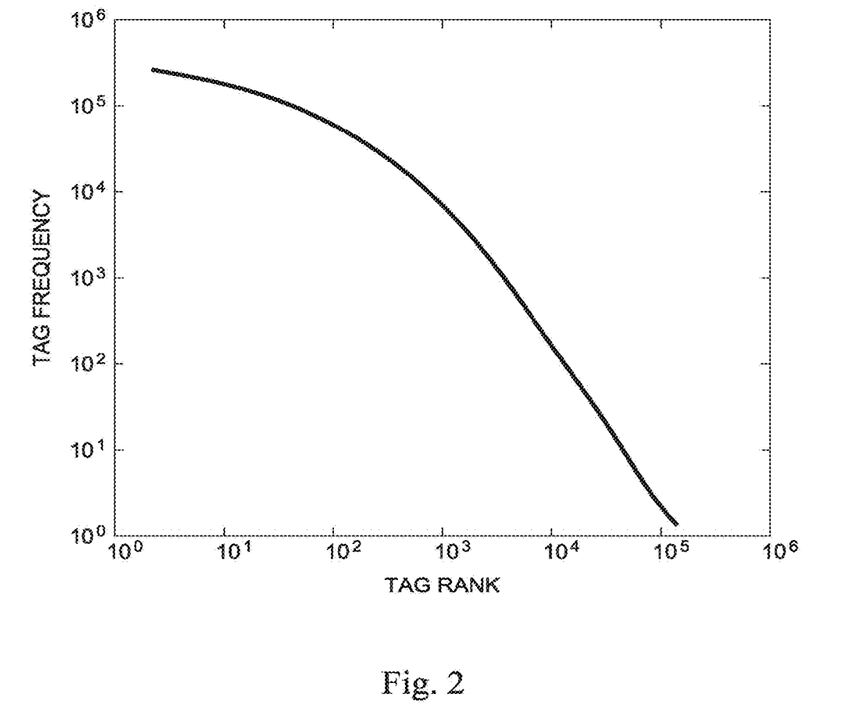
FIG. 2 illustrates the distribution of tag frequency taken from the same random set of one million images on a log-log scale.

FIG. 2 presents the distribution of tag frequency taken from the same random set of one million images on a log-log scale. The x-axis represents the unique tags ordered in a decreasing order of tag frequency. The y-axis represents the frequency of the tags in the set of images. The power law fit was attempted and proved to be a good fit for tags of the Flickr images. [Sigurbjörnsson]. In contrast, for stock photography images, it was proved that the power law was not a good fit for the distribution with a p-value near zero [See: "Power-law distributions in empirical data," A. Clauset, C. R. Shalizi, and M. E. J. Newman, SIAM Rev., 51(4):661-703, November 2009][ Clauset et al.].

Power law was not a good fit in the context of stock photography either. FIG. 1 depicts the over-representation of popular tags at the head of the distribution and under representation of tags at the tail of the distribution. This may be because many commercial contributors often use automated tools for generating image tags. As a result, commercial tag contributors tend to over suggest popular tags. Furthermore, in a typical commercial setting, commercial tag contributors are more likely to upload a series of many highly related images and attempt to maintain the same tags across the uploaded series. Because an attempt is made to maintain the same tags for a series of uploaded images, naturally the same tags are used time and again. This tendency of the commercial contributors to reuse tags across a series may have an adverse impact on tag diversity.

Most stock photography images generally have a large number of tags. It is possible to employ the tag recommendation algorithm to recommend additional tags based on each of the large number of stock photography tags. However, a more typical scenario is to ask an image contributor to provide a small number of highly relevant tags for an image contributed by the image contributor, and to then recommend related tags based on the small number of highly relevant tags. In order to mimic the situation of a contributor providing the more pertinent tags for an image, Amazon's Mechanical Turk was used to gather tags for 200 stock photography images. The image set was chosen at random in a way that matched the image category distribution of the entire collection.

Figure 7:
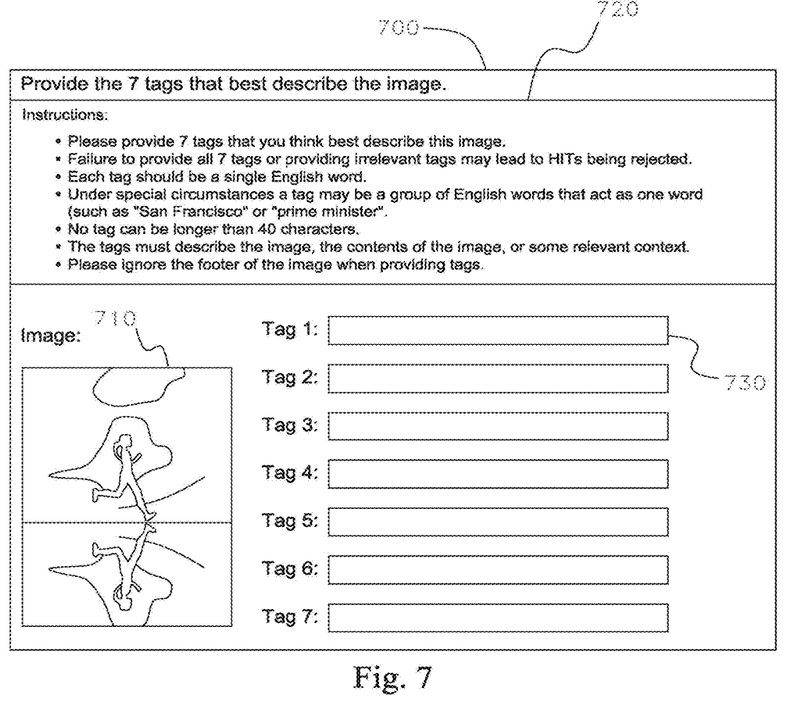
FIG. 7 depicts an interface used in implementing the MTurk assignment.

Now referring to FIG. 7 depicting an interface used in implementing a second MTurk assignment [Second Assignment]. Half of the images were treated as training data and half of the images were used for evaluation purposes. For each of the 200 images, 7 tags were requested from 20 different workers for a total of 4,000 MTurk assignments. Prior to conducting the second assignment, workers were screened and work was evaluated to ensure quality, as suggested in Rashtchian [See: Rashtchian et al.]. An example of the MTurk task is shown in FIG. 7. A particular image 710 was displayed for the workers on an interface 700. The workers were assigned the task of providing seven appropriate tags for the image 710. The MTurk assignment outlined specific instructions 720 for the workers. For example, each worker was required to provide at least seven tags that best describe the image 710, the tags were required to be a single English word, and the like. Workers were required to provide tags in the designated area 730 on the interface 700.

The results for this assignment were aggregated and a distribution of tag frequency was generated for each of the 200 images. To avoid including uncommon tags, any tag that was not suggested at least twice for an image was dropped, leaving at least ten unique tags for each image. This data set is subsequently referred to as FF-TAGS to reflect the free-form nature of the tag gathering task (FF-TAGS).

Tag co-occurrence is a useful technique that provides a basis for tag recommendation. An overview of the recommender strategy using co-occurrence is presented in FIG. 3, which depicts a flow chart of events happening when using a co-occurrence based tag recommender 340. A tag co-occurrence matrix 310 may be derived from the image collection 320. Image collection 320 may contain a very large collection of tagged stock photography images. For example, for the results presented in table 1 shown in FIG. 6, the image collection consisted of 10 million tagged stock photography images. A tag recommender 340 accepted an image tag input 300 which is a set of image tags from a user or a search engine, not shown in FIG. 3. The tag recommender 340 used the tag co-occurrence matrix 310 to identify a set of tags that typically occurs in conjunction with the tags contained in image tag input 300. Interestingly, tag co-occurrence matrix 310 was a sparse co-occurrence matrix constructed and pruned to only include tags that co-occurred in at least 10 images, resulting in 14.9M unique tag pairs. The tag recommender 340 used in this experiment followed the summing strategy presented in Sigurbjörnsson.

In the case of Flickr, Sigurbjörnsson argued that an asymmetric co-occurrence measure provides the best tags:

$$P(t_j \mid t_i) := \frac{|t_i \cap t_j|}{t_i}$$

Where the asymmetric co-occurrence measure of tag $t_j$ given tag $t_j$ is a normalized measure of how often the tags $t_j$ and $t_i$ appear together. Symmetric co-occurrence measure i.e. Jaccard coefficient for tags $t_j$ and $t_i$ was considered as an alternative:

$$J(t_i, t_j) := \frac{|t_i \cap t_j|}{|t_i \cup t_j|}$$

It was observed that the symmetric co-occurrence measure and the asymmetric co-occurrence measure often recommended different sets of tags. The asymmetric co-occurrence measure is susceptible to recommending very common tags too often.

On the other hand, the symmetric measure (SYM) may be too restrictive in some cases and tends to find tags with equivalent meaning. In an attempt to capture the benefits of both the symmetric co-occurrence measure and the asymmetric co-occurrence measure, a recommender using a linear combination of both the symmetric co-occurrence measure and the asymmetric co-occurrence measure was tested (SYM-ASYM):

$$\text{SYM-ASYM}(t_j|t_i) := \lambda J(t_i, t_j) + P(t_j|t_i)$$

Figure 6:
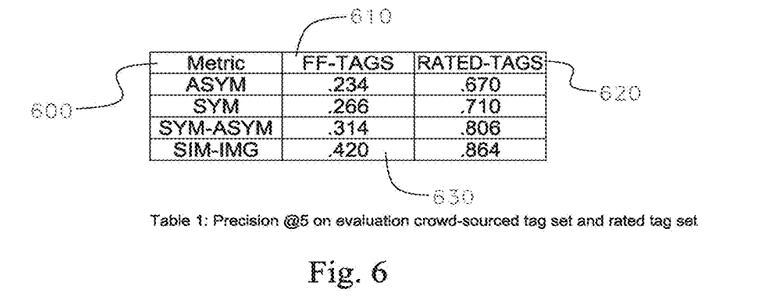
FIG. 6 illustrates a table indicating Precision @5 on evaluation crowd-sourced tag set and rated tag set.

To obtain the weight parameter λ the recommender was trained using the 100 training images obtained in FF-TAGS. The top 4 most-suggested tags for each image were provided as an input tags to the recommender. Then the recommendations were evaluated using precision at rank 5 (P@5). Table 1 shown in FIG. 6 illustrates how many of the recommended tags are considered relevant. Metric 600 of Table 1 indicates which tag generation measure was adopted to reach a particular finding. Four separate measures i.e. symmetric co-occurrence measure (SYM), asymmetric co-occurrence measure (ASYM), a combination of asymmetric and symmetric co-occurrence measure (SYM-ASYM), and a combination of keyword co-occurrence measure with similar image information (SIM-IMG) were adopted to conduct this experiment.

Column 610 refers to the reading of the given measures for FF-TAGS. As discussed above in conjunction with FIG. 7, to avoid consideration of uncommon tags, any tag that was not suggested at least twice for an image was dropped, leaving at least ten unique tags for each image. In other words, any tags that appeared at least twice for the input image in FF-TAGS are considered to be relevant. Column 620 refers to the reading of the given measures for RATED-TAGS.

As will be discussed later with reference to FIG. 8, a group of workers were assigned to rate an association of an image and a tag. The set of ratings were tallied across the workers and ties were broken in favor of "Not Good". Using this rating set i.e. RATED-TAGS, P@5 (Precision at 5) was computed for the four above mentioned recommenders. Results of this computation are shown in Column 620. The hill-climbing technique was used and it was observed that P@5 was optimal when λ=4. Then SYM, ASYM, and SYM-ASYM (with λ=4) were compared on the evaluation set of images following the same methodology. The recommender using SYM-ASYM combination measure did result in the highest precision, as seen at box 630 of Table 1. Surprisingly ASYM performed the worst of the three measures.

A novel tag recommender employing a combination search strategy is suggested in the present disclosure. Advantageously, the search strategy of the novel tag recommender supplements keyword co-occurrence searching with searching similar image information (SIM-IMG). A flow chart embodying this strategy is depicted in FIG. 4, which illustrates additional steps added to the conventional tag co-occurrence based recommender.

Figure 4:
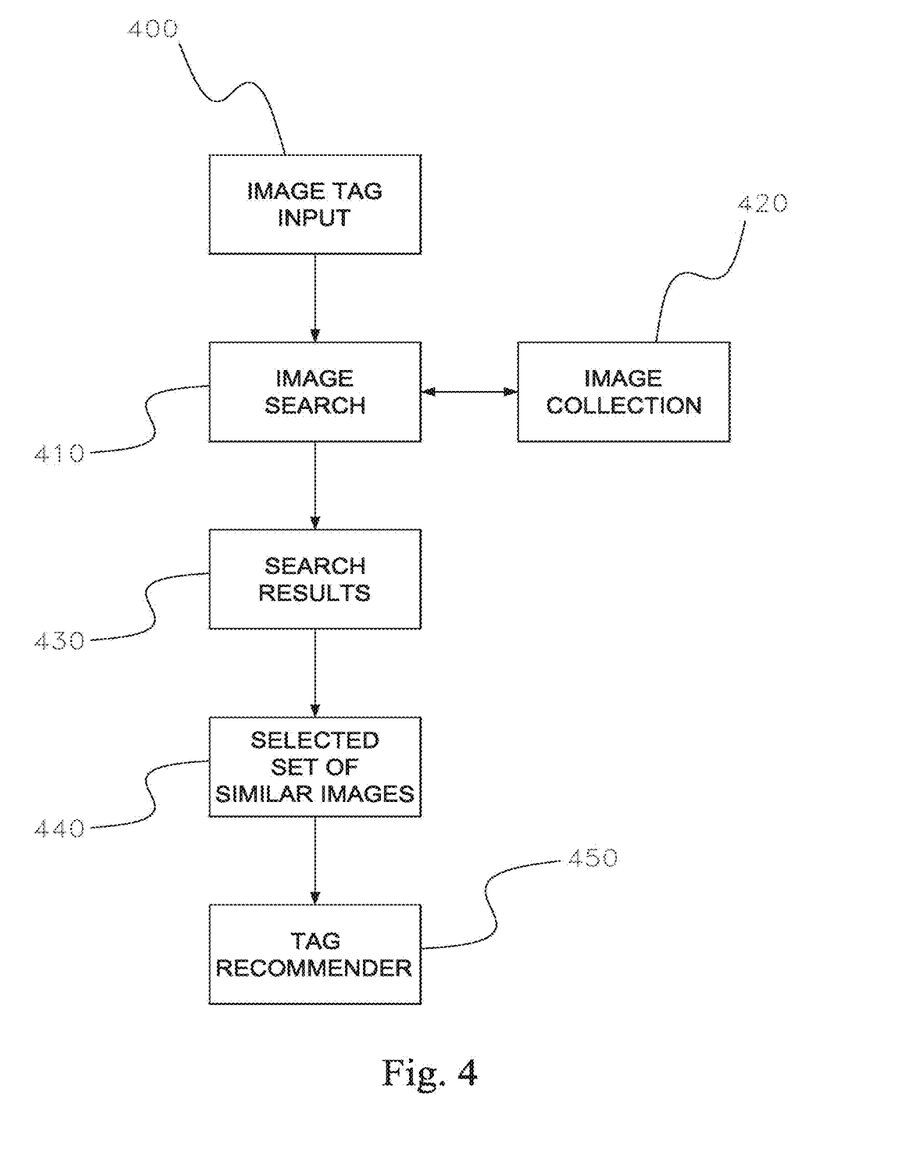
FIG. 4 illustrates additional steps added to the conventional tag co-occurrence based tag recommender.

At step 400, an image tag input is received from a user or a search engine, not shown in FIG. 4. In one embodiment of the disclosed invention, an image contributor is a user entering the image tag input at step 400. Generally, an image contributor enters the image tag input at step 400 to identify an additional set of pertinent image tags using the novel tag recommender 450. Using the image tag input provided at step 400, an image search is carried out at step 410 against the image collection 420 to locate a set of images, wherein a subset of the images in the set of images are similar to the image tag input received at step 400. After performing the image search at step 410, search results are generated at step 430. At step 440, the selected similar images are presented to the tag recommender 450.

Importantly, the selected set of similar images 440 provides additional context information available to the tag recommender 450, which enables the tag recommender to suggest to the image contributor, a set of tags that adequately describes, accurately define and precisely label the image being tagged. For example, the tag recommender 450 can consider the tags associated with the selected set of similar images 440. In a preferred embodiment of the disclosed invention, the tag recommender 450 may consider frequency of a particular tag in the selected set of similar images 440. If a specific tag is associated with most of the images in the selected set of similar images 440, it is likely to be a good recommendation candidate. Similarly, if a specific tag is not associated with any of the images in the selected set of similar images 440, it is not likely to be a good recommendation candidate.

Furthermore, if behavioral data is available for the selected set of similar images 440, it can further assist the tag recommender 450 in determining whether or not a particular tag should be recommended to the image contributor. For example, behavioral data can indicate whether a particular tag has appeared in queries that led to a similar image being downloaded or viewed. Further, behavioral data can also indicate how frequently a particular tag has appeared in queries that lead to a similar image being downloaded or viewed. Based on the behavioral data, the tag recommender 450 can determine whether or not a particular tag is recommended. In other words, a particular tag frequently appearing in queries that lead to a similar image being downloaded or viewed is a strong indication that the tag is also relevant to the input image which the image contributor is seeking to tag.

Once retrieved, various attributes can be derived from the selected set of similar images 440 and may be used by the tag recommender 450. Based on a set of preferences, specific attributes can be derived from the selected set of similar images. In one embodiment, the set of preferences are preconfigured by the image contributors. Alternatively, the set of preferences may be preconfigured by users of the tag recommender 450. This is in contrast to the conventional co-occurrence based tag recommenders generating tag recommendations based entirely on tag co-occurrence. In one embodiment of the disclosed invention, the tag recommender 450 derived and used six different attributes from the set of similar images 440.

The attributes derived and used by the tag recommender 450 were (1) tags associated with the selected set of similar images (2) descriptions associated with the selected set of similar images (3) frequency of the tag occurrence in queries that lead to a similar image being downloaded (4) frequency of the tag occurrence in queries that lead to a similar image being viewed (5) tags recommended by the symmetric co-occurrence measure (6) tags recommended by the asymmetric co-occurrence measure. The tag recommender 450 used a weighted summing strategy to generate recommended tags after combining the six attributes derived from the selected set of similar images 440.

It is noted that the tag recommender 450 processes the selected similar images generated at step 440 along with the selected similar tags generated at step 330 to present a set of tags to the image contributor, wherein the set of tags is based on both tag co-occurrence and similar images. The manner in which tag recommender 450 processes selected similar tags and selected similar images is further illustrated in conjunction with FIG. 5.

Figure 5:
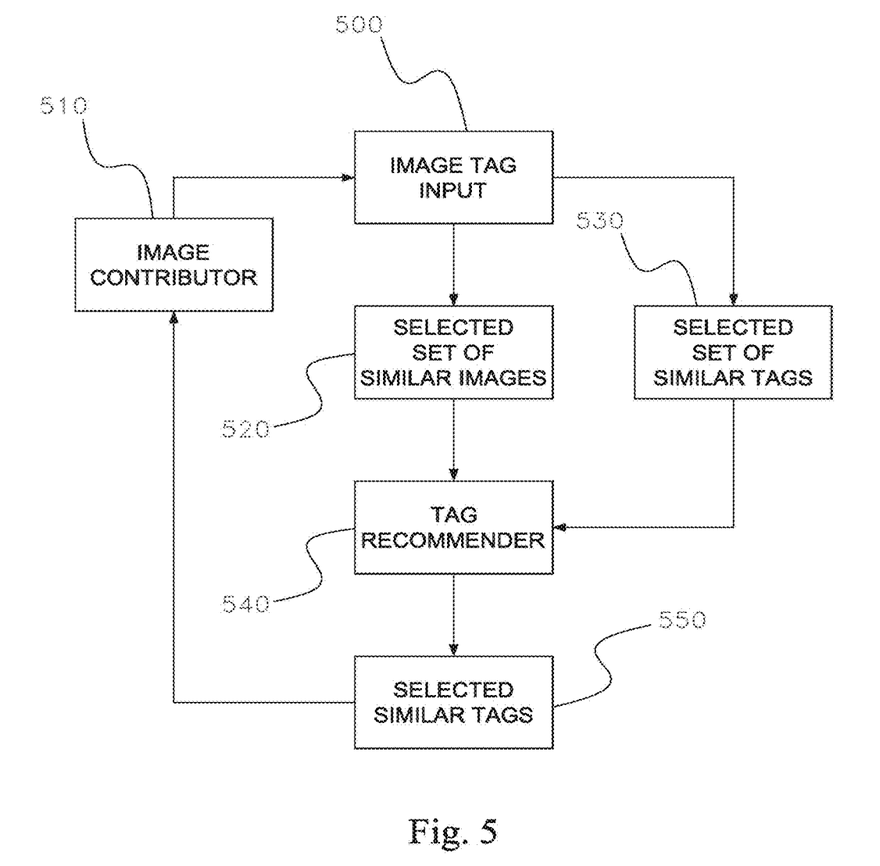
FIG. 5 shows a flow chart of the tag recommender according to the preferred embodiment of the disclosed invention.

Now referring to FIG. 5 depicting a flow chart of the tag recommender according to the preferred embodiment of the disclosed invention. The tag recommender 540 takes as input both a set of relevant image tags as well as a set of similar images and generates a set of recommended tags. The process begins at step 510 when an image contributor or a user enters an image tag input 500. At step 520, the tag recommender 540 generates a selected set of similar images. The manner in which the selected set of similar images is generated is discussed in further detail in conjunction with FIG. 4.

At step 530, the tag recommender 540 generates a selected set of similar tags, wherein each tag in the selected set of tags is separate and distinct from the image tag input entered by the image contributor. The manner in which the selected set of similar tags is generated is discussed in further detail in conjunction with FIG. 3.

Now referring back to table 1 in FIG. 6, which is a table indicating Precision @5 on evaluation crowd-sourced tag set and rated tag set. SIM-IMG is one embodiment of the tag recommender 540 depicted in FIG. 5. The FF-TAGS training set and hill climbing techniques were used to train weights to the SIM-IMG recommender. For each image, the four most suggested tags were designated as image tag input. A search was conducted using the four most suggested tags and had a group of experts select the four most similar images from the first 100 results. Then this optimal weight vector was used to calculate P@5 on the evaluation set. It was found that the precision (0.420) was significantly higher than any of the co-occurrence recommenders (left column, Table 1), illustrating the benefit of the added context information extracted from the selected set of similar images.

Figure 8:
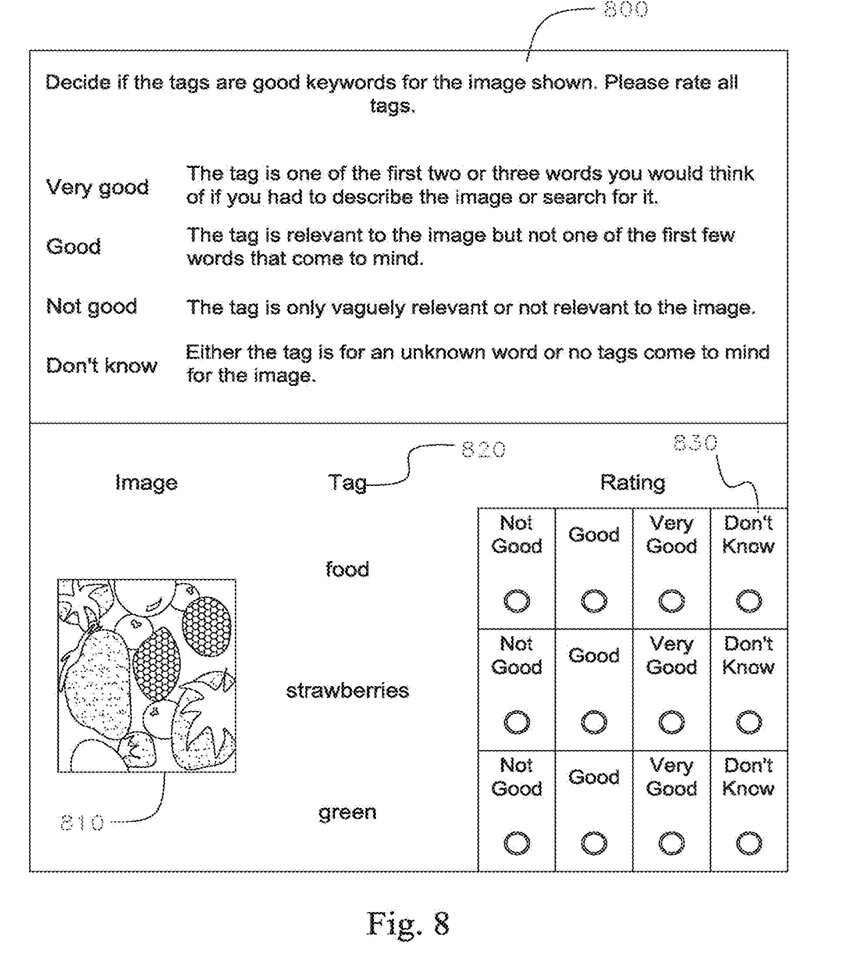
FIG. 8 shows an interface of a second experiment conducted using MTurk.

Referring now to FIG. 8 depicting an interface of a second experiment conducted using MTurk. To ensure that the results of the first experiment were applicable beyond the FF-TAGS data set a second, independent experiment was conducted. Using the hundred evaluation images from FF-TAGS, four different recommender strategies were applied. The top five recommendations from each strategy were identified and explicit tag ratings for each strategy were obtained, again using MTurk. Following the Sigurbjörnsson methodology, Interface 800 displaying image 810 was presented.

All image-tag pairs were presented to five different MTurk workers who were asked to rate the recommended tag on the rating portion 830 of the interface 800. The ratings portion 830 included tag rating gradations such as tag being: "Not Good", "Good", "Very Good", or "Don't Know". As in Sigurbjörnsson, gradations "Good" and "Very Good" were treated equally, turning the rating task into the rating task indicating a binary rating.

The ratings were tallied across the workers and ties were broken in favor of "Not Good". Using this rating set i.e. RATED-TAGS, P@5 was computed for the four above mentioned recommenders. Results are shown in Table 1 in FIG. 6 (right column). Once again it was observed that the SIM-IMG strategy out-performed all recommenders that were based entirely on tag co-occurrence.

Figure 9:
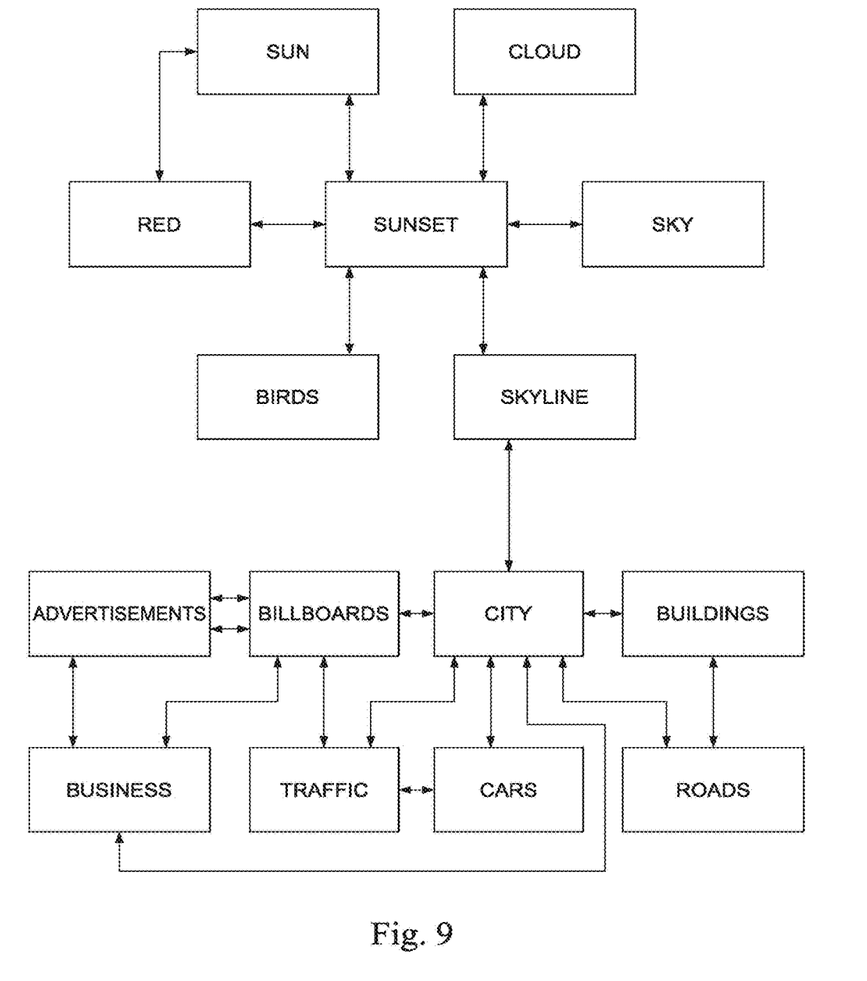
FIG. 9 indicates a graphic representation a tag co-occurrence matrix of the disclosed invention.

Now referring to FIG. 9 depicting a graphic representation of a tag co-occurrence matrix of the disclosed invention. A co-occurrence matrix has a list of image tags which includes tags for all the images in the image collection database. An example of image collection database is shown as the image collection 320 and the image collection 420 shown in FIG. 3 and FIG. 4 respectively. For each tag in the list of tags in the image collection database, the co-occurrence matrix may include a list of tags, wherein the list of tags may comprise each tag associated with an image that has at least once appeared in a query along with the image being annotated. Alternatively, the list of tags may comprise each tag associated with an image that has at least once been downloaded along with the download of the image being annotated. The co-occurrence matrices may be constructed based on how often tags co-occur in the image library, i.e. co-occurrence (tag l, tag j) indicates a count of how many images contain both tag i and tag j. In an alternate embodiment of the disclosed invention, tag co-occurrence matrices may be constructed based on various attributes including but not limited to query traffic data, user profile data, user behavior data, revenue considerations, and the like.

As seen in FIG. 9, if a stock photography contributor is seeking to effectively annotate an image of a sunset, then, the co-occurrence matrix may contain non-zero entries for the pairs (sunset, sun), (sunset, red), (sunset, birds), (sunset, skyline), (sunset, sky) and (sunset, cloud). Similarly, if a stock photography contributor is seeking to effectively annotate an image of a city, then, the co-occurrence matrix may contain non-zero entries for the tag pairs (city, buildings), (city, roads), (city, cars), (city, traffic), (city, business), and (city, billboards) since there are images containing both of the tags. It will be appreciated that the above mentioned list is presented for example sake, and can include additional or distinct image tags, which are not presented here due to space constraints.

Figure 10:
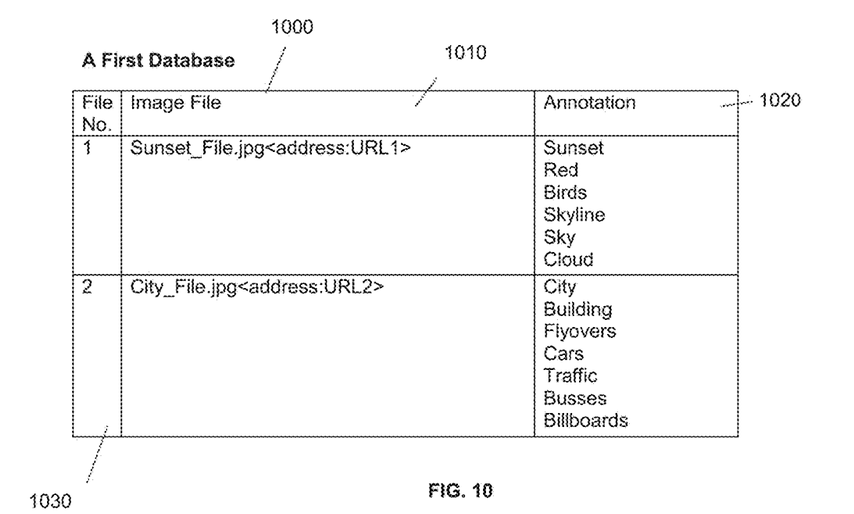
FIGS. 10 and 11 depict example databases in accordance with certain disclosed embodiments.

FIG. 10 depicts a first database 1000 of the disclosed embodiment. The system maintains a first database comprising a set of records, each record comprising a media file and a set of annotations associated with the media file set, wherein the set of annotation describe the media file. The first database 1000 comprises file number 1030, which indicates position of an image file 1010 in the first database 1000. An annotation field 1020 of the first database 1000, indicates a set of tags that are commonly used to describe the image file 1010. For example, six tags: Sunset, Red, Birds, Skyline, Sky, and Cloud describe an image file named Sunset_file.jpg, which is stored at address URL1. Similarly, City, Building, Flyovers, Cars, Traffic, Busses, and Billboards are the seven tags that describe an image file named City_file.jpg, which is stored at address URL2.

Figure 11:
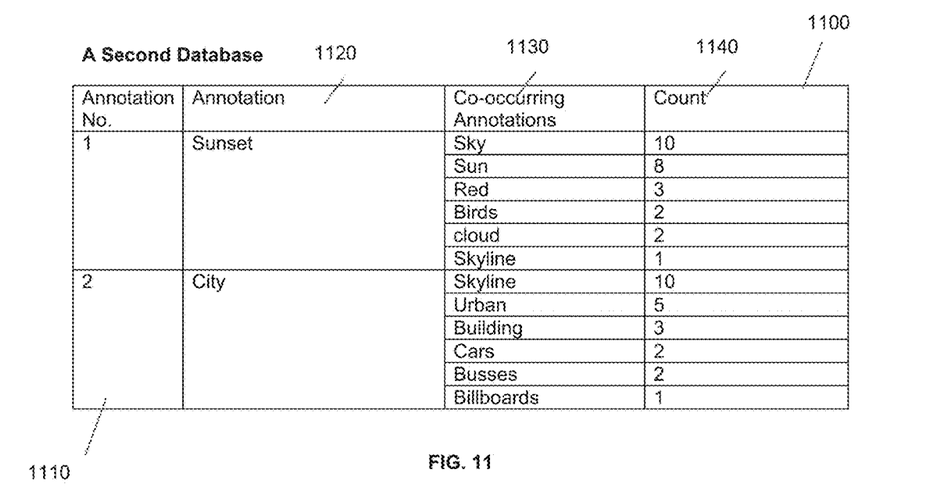

The system also maintains a second database comprising a second set of records, each record comprising an annotation, at least one co-occurring annotation, and a count indicating a number of media files associated with the annotation and the at least one co-occurring annotation. A second database 1100 of the disclosed embodiment is illustrated in FIG. 11. The second database 1100 is a representation of the tag co-occurrence matrix. As such, the tag-occurrence matrix does not directly contain any references to any images in the first database. It associates a given tag with a list of (tag, count) pairs.

Annotation 1120 indicates a tag entered by a user. Co-occurring annotations 1130 are the tags that have appeared with a given annotation 1120 on several occasions. The exact number of times the annotation and co-occurring annotation have appeared together is indicated by count 1140. For example, the tag "city" may be associated with (skyline, 10), (urban, 5), (buildings, 3), (cars, 2), (busses, 2), (billboards, 1) which represents the fact that 10 images contain both the tags city and skyline, 5 images contain both city and urban, etc. The system of the disclosed invention is configured to maintain title information and behavioral data associated with the set of similar image files, for example, how often the image was downloaded starting with a query for one of its tags.

The system may then conduct a first query on the second database using the media file tag input to identify a ranked set of co-occurring annotations and a count associated with each annotation in the ranked set of co-occurring annotations. The ranked set of co-occurring annotations is an ordered listing of co-occurring annotations from the second database 1120, for example, the count associated with tag sky is 10, and the count associated with tag sun is 8. Accordingly the tags are arranged in a descending order.

From the ranked set of co-occurring annotations, the system may identify the selective group of annotations from the ranked set of co-occurring annotations, such that the count associated with each annotation selective group of annotations meets a predefined criterion. For example, in one embodiment of the disclosed invention, the system may define the selective group of annotations where the count associated with each annotation is greater than 8.

Alternatively, any other number may be set as a predefined criterion. After identifying the ranked set of co-occurring annotations, the system may conduct a second query on the first database to identify a selected set of similar media files, by iteratively retrieving image files associated each annotation from the selective group of annotations. Then the system may present a list of recommended annotations based on the ranked set of co-occurring annotations and the selected set of similar media files.

The system may alternatively generate the set of similar media files is based on a predefined criterion such as appearance of the given media files in a same query, or appearance of the given media files in a same download transaction. The system may maintain title information and behavioral data associated with the set of similar media file files. Similarly, the system may maintain the transaction history by maintaining for each received media file tag input, the ranked set of co-occurring annotations and the selected set of similar media files. The system may also maintain the transaction history such as media files downloaded from the first database for each received media file tag input.

Tagging remains an important component of an effective image retrieval system. In contrast to previous studies a linear combination of symmetric and asymmetric co-occurrence measures improved recommended tag quality. The disclosed new recommendation strategy incorporates similar images and co-occurrence matrix to significantly improve the precision of recommended tags. In one embodiment of the disclosed invention the selection of similar images is automated so that relevant tags could be added to images in an automated fashion.

The invention claimed is:

1. A context based tag recommendation system for precisely annotating stock photography media files, the system comprising:
    a memory comprising instructions; and
    a data processor executing the instructions to perform the following operations:
        receive, for an input media file, an input annotation;
        identify, in a second database, (1) a set of co-occurring annotations that occur for media files associated with the input annotation, and (2) a count associated with each co-occurring annotation from the set of annotations indicating for how many media files in a first database the co-occurring annotation occurs with the input annotation, wherein the second database comprises records, each record in the comprising the count indicating the number of media files from the first database associated with the annotation and the respective co-occurring annotation;
        identify, in a first database, media files similar to the input media file by retrieving media files associated with annotations, from the set of co-occurring annotations, having an associated count meeting a predefined criterion indicating a minimum number of media files in the first database for which the co-occurring annotation occurs with the input annotation; and
        selecting annotations associated with the similar media files that have the associated count meeting the predefined criterion to present as a list of recommended annotations for the input media file.

2. The system of claim 1, wherein the predefined criterion further comprises media files that have appeared together in a same query.

3. The system of claim 1, wherein the predefined criterion further comprises media files that have appeared in a same download transaction.

4. The system of claim 1, wherein the input annotation is provided by a media file contributor.

5. The system of claim 4, wherein each annotation in the set of co-occurring annotations is separate and distinct from the input annotation provided by the media file contributor.

6. The system of claim 1, wherein the input annotation is provided by a user.

7. The system of claim 1, wherein the system is further configured to maintain in a transaction history title information and behavioral data associated with the similar media file files.

8. The system of claim 7, wherein the transaction history comprises, for each received input annotation, the set of co-occurring annotations and identified similar media files.

9. The system of claim 7, wherein the transaction history comprises, for each received input annotation, media files downloaded from the first database associated with the input annotation.

10. A method comprising:
receiving, for an input media file, an input annotation;
identifying, in a second database, (1) a set of co-occurring annotations that occur for media files associated with the input annotation, and (2) a count associated with each co-occurring annotation from the set of annotations indicating for how many media files in a first database the co-occurring annotation occurs with the input annotation, wherein the second database comprises records, each record in the comprising the count indicating the number of media files from the first database associated with the annotation and the respective co-occurring annotation;
identifying, in a first database, media files similar to the input media file by retrieving media files associated with annotations, from the set of co-occurring annotations, having an associated count meeting a predefined criterion indicating a minimum number of media files in the first database for which the co-occurring annotation occurs with the input annotation; and
selecting annotations associated with the similar media files that have the associated count meeting the predefined criterion to present as a list of recommended annotations for the input media file.

11. The method of claim 10, wherein the predefined criterion further comprises media files that have appeared together in a same query.

12. The method of claim 10, wherein the predefined criterion further comprises media files that have appeared in a same download transaction.

13. The method of claim 10, wherein the input annotation is provided by a media file contributor.

14. The method of claim 13, wherein each annotation in the set of co-occurring annotations is separate and distinct from the input annotation provided by the media file contributor.

15. The method of claim 10, wherein the input annotation is provided by a user.

16. The method of claim 10, wherein the method further comprises maintaining in a transaction history title information and behavioral data associated with the similar media file files.

17. The method of claim 16, wherein the transaction history comprises, for each received input annotation, the set of co-occurring annotations and identified similar media files.

18. The method of claim 16, wherein the transaction history comprises, for each received input annotation, media files downloaded from the first database associated with the input annotation.

* * * * *